United States Patent [19]

Carroll et al.

[11] Patent Number: 4,513,012

[45] Date of Patent: Apr. 23, 1985

[54] POWDERED CENTER-FILLED CHEWING GUM COMPOSITIONS

[75] Inventors: Thomas J. Carroll, Astoria; Vincent G. Corsello, Albertson; Michael Glass, Flushing; Dominic J. Piccolo, Brooklyn, all of N.Y.

[73] Assignee: Warner-Lambert Company, Morris Plains, N.J.

[21] Appl. No.: 494,215

[22] Filed: May 13, 1983

[51] Int. Cl.³ .............................................. A23G 3/30
[52] U.S. Cl. .......................................... 426/5; 426/103
[58] Field of Search ....................... 426/3-6, 426/103

[56] References Cited

U.S. PATENT DOCUMENTS

| | | | |
|---|---|---|---|
| 3,020,164 | 2/1962 | Forkner | 426/5 |
| 3,071,476 | 1/1963 | Werft et al. | 426/5 |
| 3,262,784 | 7/1966 | Bucher | 426/5 |
| 3,857,963 | 12/1974 | Graff et al. | 426/3 |
| 4,252,829 | 2/1981 | Terrevazzi | 426/3 |
| 4,269,860 | 5/1981 | Ogawa et al. | 426/5 |

*Primary Examiner*—Jeanette Hunter
*Attorney, Agent, or Firm*—Daniel A. Scola; Charles A. Gaglia, Jr.

[57] ABSTRACT

A center-filled chewing gum comprising an outer-shell and a cavity enclosed by said outer-shell wherein there is contained in said cavity a dry, powdered center-filled composition comprising at least one sweetener and a lubricant selected from the group consisting of magnesium stearate, talc and colloidal silica.

19 Claims, No Drawings

POWDERED CENTER-FILLED CHEWING GUM COMPOSITIONS

The instant invention concerns center-filled chewing gum compositions and chewing gum pieces wherein the center-fill is a dry powder. The instant invention also concerns a dry powdered center-fill for chewing gum pieces and the process for producing the same.

Center-filled chewing gum pieces are well-known to the art U.S. Pat. No. 810,210 discloses a chewing gum piece filled with a liquid such as a fruit syrup, or with a semi-liquid such as a paste or jelly. U.S. Pat. No. 3,894,154 discloses a chewing gum piece having an enclosed cavity formed therein and a liquid fill in the cavity. The liquid fill includes an aqueous solution having a dissolved solids portion and glycerin for retarding increases in viscosity of the liquid fill.

Thus, the prior art center-filled chewing gum compositions have focused on keeping the liquid center-fill from becoming dry and subsequently solid or too viscous. The instant invention is, however, directed toward a chewing gum piece having a dry, powdered center-fill, which is required to be in solid form. The instant dry powdered center-filled gum pieces therefore do not suffer from the disadvantages of the prior art liquid center since there is no need to worry about liquid bleeding from the core or hardening due to moisture level changes.

Thus, the instant invention's center-filled chewing gum pieces comprise an outer shell and a cavity enclosed therein, containing a dry, powdered center-fill. The center-fill is a powder or dry particulate granulation having a varied particle size. The center-fill is generally present in the chewing gum piece in the range of about 10% to about 20% by weight of the gum piece and preferably about 15% to about 19% by weight of the gum piece.

The gum piece comprises an outer shell, which is in turn comprised of a variety of well-known ingredients standard in the art, and a powdered center-fill contained in the cavity of the outer-shell comprising at least one sweetener and optionally a flavor, color and filler.

By the term "chewing gum piece," the applicant is referring to finished product, i.e, the powdered center-filled chewing gum. The chewing gum piece is comprised of the outer shell and the powdered center-fill. The outer-shell may be referred to as the "chewing gum composition" since it may be formed from ingredients and formulations known in the art, and may be used as a chewing gum piece without the center-fill.

The gum pieces of the instant invention have the outer-shell formulated to give the desired chewing gum type. For instance, if a bubble gum type is intended, the chew characteristics, film forming ability and texture is balanced to produce good bubbles. If a regular or different chewing gum type is desired, the formulation would reflect the intended physical properties sought. The instant gum pieces may be sugar or sugarless, or a combination thereof. For example, a sugarless powdered center-fill may be contained in a sugar containing outer-shell and the converse is also true. Non-adhesive outer-shell formulations are contemplated, as well as a variety of other chewing gum compositions known in the art. The specific formulation of the outer-shell is not critical to an understanding and appreciation of the invention, provided it allows for proper processing and center-filling and exhibits acceptable stability and shelf-life.

The chewing gum pieces having a powder center-fill of the instant invention are preferably of the bubble gum type; that is, the formulation for the outer-shell of the gum piece is formulated to allow good bubbles to be blown. The gum piece shape is preferably of the "chunk" or "pillow" configuration, although shape is a function of processing convenience and market feasibility and thus may vary accordingly over the years.

More particularly, the dry powdered center-fill of the instant invention comprises at least one sweetener selected from the group consisting of water-soluble agents, water soluble artificial sweeteners, dipeptide based sweeteners and combinations thereof. Among the water-soluble sweeteners useful are the monosaccharides, disaccharides, and polysaccharides such as sugar, sucrose, xylose, ribose, glucose, mannose, galactose, fructose, dextrose, maltose; and the polyhydric sugar alcohols such as sorbitol, xylitol, mannitol, and hydrogenated starch hydrolysate, and mixtures thereof.

Additionally, the water-soluble artificial sweeteners useful include, among others, the soluble saccharine salts, i.e., sodium or calcium saccharin salts, cyclamate salts, acesulfame-K and the like and the free acid form of saccharin.

Dipeptide based sweeteners such as L-aspartyl-L-phenylalanine methyl ester and material described in U.S. Pat. No. 3,492,131 and the like may also be employed.

Most preferably the sweeteners of the powdered center-fill comprises granulated or powdered sugar. Artificial sweeteners may be admixed with the sugar as well as to adjust the desired level of sweetness.

The sweetener is generally present in the center-fill from about 80% to about 98% by weight of the center-fill. In the instance where the sweetener is sugar, it is preferably present in the amounts of about 90% to about 99% by weight of the center-fill and most preferably from about 95% to about 98%.

Other ingredients which may be added to the instant center-fill mixtures include flavors, acidulents, lubricants, fillers and colors. These ingredients while preferred, are not critical to the understanding of the instant invention. Flavors which are useful include those well known to the chewing gum art. These flavoring agents may be chosen from synthetic flavor oils/flavoring aromatics and/or oils, oleo resins and extracts derived from plants, leaves, flowers, fruits and so forth, and combinations thereof. Representative flavor oils include: spearmint oil, cinnamon oil, oil of wintergreen (methylsalicylate) and peppermint oils.

Also useful are artificial, natural or synthetic fruit flavors such as citrus oil including lemon, orange, grape, lime and grapefruit and fruit essences including apple, strawberry, cherry, pineapple and so forth.

The amount of flavoring agent employed is normally a matter of preference subject to such factors as flavor type, gum base type and strength desired. In general, amounts of about 0.2% to about 1.5% by weight of the powdered center-fill. The flavors are in dry particulate form, as are all of the ingredients in the center-fills of the instant invention. As will be discussed below, the instant invention offers a means of delivering several flavors at once, since the powdered center-fill may be one flavor, while the outer chewing gum shell may be of the same or different flavor.

Acidulents or food acids, when present in the powdered center-fills of the instant invention are generally present in amounts of about 0.5% to about 3.0% by weight of the center-fill; the preferred range being from about 1.5% to about 2.5% by weight of the center-fill. Among those acidulents useful include citric acid, malic acid, tartaric acid and the like, as well as mixtures thereof. In cases where the outer shell of the gum piece is a fruit or citrus flavor, it may be most desirable to include one of these acidulents in the powdered center-fill mixture to further impart a tartness to the overall taste of the chewing gum. Thus, the fruitiness, for example, of a citrus flavored outer-shell is supported by the tartness of the center-fill. The most preferred of the above-mentioned food acids are citric acid and malic acid and mixtures thereof.

Fillers may be added to the center-fill and are selected from those well known to the art, with the exception of the carbonate salts. Such salts would generally have an adverse affect on the instant center-fills since they would be expected to react with acidulents or other ingredients and produce gas. Among the useful fillers for the center-fill are dextrins, malto dextrins, polydextrose and dicalcium phosphate. Malto dextrins have the additional advantage of providing enhanced sweetness, thereby complementing the sweetening agent already present. Polydextrose is generally understood in the art to be a randomly crosslinked polymer of all types of glucosidic bonds. Sorbitol end groups and monoester bonds with citric acid are ordinarily present in the polymer as well. Small amounts of residual reactants such as glucose, sorbitol and citric acid may be present in commerically available polydextrose. The filler is primarily added for the purpose of contributing bulk to the center-fill, particularly when the sweetener is of the artificial variety.

Lubricants and other well known processing aids may be optionally present in amounts of up to about 1.5% by weight of the center-fill and preferably about 0.75% to about 1.0%. The appropriate range selection is, however, a matter of routine experimentation for the skilled person in the art. Examples of lubricants useful in the instant powdered center-fills are magnesium stearate and compounds of the silicate family such as talc and cab-o-sil.

Should it be desirable to have a center-fill be a particular color, for aesthetic reasons or for coordination with the flavor perception, any food grade color which is compatible may be employed. For example, the FD&C colors are of particular utility and are generally present in trace amounts, i.e., from about 0.003% to about 0.08% by weight of the center-fill. The preferred colors are FD&C red #40 and #3, among others.

The outer-shell of the chewing gum piece may be formulated from standard ingredients and by known methods in the art. The shell is comprised of a gum base and such additional additives which would ordinarily be included to comprise a chewing gum composition, i.e., corn syrup, sugar, flavor and fillers and the like.

The amount of gum base employed will vary greatly depending on various factors such as the type of base used, consistency desired and other components used to make the final product. In general, amounts of about 5% to about 45% by weight of the final chewing gum composition are acceptable for use in chewing gum compositions with preferred amounts of about 15% to about 25% by weight. The gum base used in this invention may be any water-insoluble gum base well known in the art. Illustrative examples of suitable polymers in gum bases include both natural and synthetic elastomers and rubbers. For example, those polymers which are suitable in gum bases include, without limitation, substances of vegetable origin such as chicle, jelutong, gutta percha and crown gum. Synthetic elastomers such as butadiene-styrene copolymers, isobutylene-isoprene copolymers, polyethylene, polyisobutylene and polyvinylacetate and mixtures thereof, are particularly useful.

The gum base composition may contain elastomer solvents to aid in softening the rubber component. Such elastomer solvents may comprise methyl, glycerol or pentaerythritol esters of rosins or modified rosins, such as hydrogenated, dimerized or polymerized rosins or mixtures thereof. Examples of elastomer solvents suitable for use herein include pentaerythritol ester of partially hydrogenated wood rosin, pentaerythritol ester of wood rosin, glycerol ester of partially dimerized rosin, glycerol ester of polymerized rosin, glycerol ester of tall oil rosin, glycerol ester of wood rosin and partially hydrogenated wood rosin, and partially hydrogenated methyl ester of rosin and mixtures thereof. The solvent may be employed in an amount ranging from about 10% to about 75% and preferably about 45% to about 70% by weight of the gum base.

A variety of traditional ingredients used as plasticizers or softeners such as lanolin, stearic acid, sodium stearate, potassium stearate, glyceryl triacetate, glycerine, lecithin, and glyceryl monostearate and the like, may also be incorporated into the gum base to obtain a variety of desirable textures and consistency properties. These additional materials are generally employed in amounts of up to about 30% by weight and preferably in amounts of from about 3% to about 7% by weight of the final gum base composition.

The chewing gum compositions employing the instant gum bases generally contain sweetening agents. The sweetening agent may be selected from a wide range of materials including water-soluble agents, water-soluble artificial sweeteners, and dipeptide based sweeteners, including mixtures thereof. Without being limited to particular sweeteners, representative illustrations encompass:

A. Water-soluble sweetening agents such as monosaccharides, disaccharides and polysaccharides such as xylose, ribose, glucose, mannose, galactose, fructose, dextrose, sucrose, sugar, maltose, partially hydrolyzed starch or corn syrup solids and sugar alcohols such as sorbitol, xylitol, mannitol, hydrogeneated starch hydrolysate and mixtures thereof.

B. Water-soluble artificial sweeteners such as the soluble saccharin salts, i.e., sodium or calcium saccharin salts, cyclamate salts, acesulfam-K and the like, and the free acid form of saccharin.

C. Dipeptide based sweeteners such as L-aspartylL-phenylalanine methyl ester and materials described in U.S. Pat. No. 3,492,131 and the like.

In general, the amount of sweetener will vary with the desired amount of sweetener selected for a particular chewing gum composition. This amount will normally be 0.01% to about 90% by weight when using an easily extractable sweetener. The water-soluble sweeteners described in category A above, are preferably used in amounts of about 25% to about 75% by weight, and most preferably from about 50% to about 65% by weight of the final chewing gum composition. In contrast, the artificial sweeteners described in categories B and C are used in amounts of about 0.005% to about 5.0% and most preferably about 0.05% to about 2.5% by weight of the final chewing gum composition. These amounts are ordinarily necessary to achieve a desired level of sweetness independent from the flavor level achieved from flavor oils.

The chewing gum composition of this invention may additionally include the conventional additives of coloring agents such as titanium dioxide; emulsifiers such as lecithin and glyceryl monostearate; and fillers such as aluminum hydroxide, alumina, aluminum silicates, talc, dicalcium phosphate, calcium carbonate, and combinations thereof. Preferably the amount of fillers are about up to 25% by weight of the gum base.

Flavoring agents well known to the chewing gum art may be added to the chewing gum compositions of the instant invention. These flavoring agents may be chosen from synthetic flavor oils and flavoring aromatics, and/or oils, oleo resins and extracts derived from plants, leaves, flowers, fruits and so forth, and combinations thereof. Representative flavor oils include: spearmint oil, cinnamon oil, oil of wintergreen (methylsalicylate) and peppermint oils. Also useful are artificial, natural or synthetic fruit flavors such as citrus oil including lemon, orange, grape, lime and grapefruit and fruit essences including apple, strawberry, cherry, pineapple and so forth.

The amount of flavoring agent employed in the chewing gum shell is normally a matter of preference subject to such factors as flavor type, gum base type and strength desired. In general, amounts of about 0.5% to about 3.0% by weight of the final chewing gum composition are useable with amounts of about 0.3% to about 1.5% being preferred and about 0.7% to about 1.2% being most preferred.

The method of forming liquid center-filled chewing gums is well known. U.S. Pat. No. 3,857,963 to A. Graff describes a means of filling a chewing gum rope using concentric conduit's and extruding therefrom. The instant invention uses similar steps comprising extruda rope of hollow chewing gum though an orifice, feeding a stream of powdered center-fill through an orifice to the hollow center downstream of the orifice and venting air from the hollow center prior to entry of the center-fill stream therein. For details on the general method of center-filling chewing gums, see U.S. Pat. No. 3,857,963, which is hereby incorporated by reference. The instant invention modifies the above process, however, since the conduits for feeding the center-fill into the rope is not concentric with the extruder, but is fed from a reservoir into the extruder head via a conduit tube.

The following examples serve to provide further appreciation of the invention but are not meant in any way to restrict the effective scope of the invention. All percentages throughout the specification are by weight % of the final gum piece unless otherwise indicated.

EXAMPLES

Six chewing gum formulations were prepared using standard procedures known in the art. These formulations were used to form the outer-shell of the chewing gum piece. Thus, the outer-shell of the gum piece would serve as a vehicle for delivering the powdered center-fill. Table I discloses six formulations used for the outer-shell.

As is apparent from the Table, the first three formulations A–C, are similar to the last three, D–F, with the exception of the flavor. Each of these formulations was processed by conventional means and filled with the powdered center-fill mixtures disclosed in Table II.

TABLE I

OUTER-SHELL FORMULATION

% by weight of Outer-Shell Formulation

| Ingredient | A | B | C | D | E | F |
|---|---|---|---|---|---|---|
| Gum base | 19 | 19 | 19 | 19 | 19 | 19 |
| Corn syrup | 13 | 16 | 17 | 13 | 16 | 17 |
| Softener | 4 | 3 | 2 | 4 | 3 | 2 |
| Citric acid | 1 | 1 | 1 | 1 | 1 | 1 |
| Sugar | 62 | 60 | 60 | 62 | 60 | 60 |
| Color | 0.13 | 0.13 | 0.13 | 0.13 | 0.13 | 0.13 |
| Flavor | | | | | | |
| grape | 0.8 | 0.8 | 0.8 | 0.8 | 0.8 | 0.8 |
| cherry | 0.8 | 0.8 | 0.8 | 0.8 | 0.8 | 0.8 |

TABLE II

CENTER-FILL

% by weight of Center-Fill Formulation

| Ingredient | I | II | III | IV | V | VI |
|---|---|---|---|---|---|---|
| Sugar | 95 | 96 | 97 | 96 | 97 | 98 |
| Grape flavor | 0.8 | 0.9 | 1.0 | — | — | — |
| Cherry flavor | — | — | — | 0.46 | 0.47 | 0.48 |
| Citric acid | 2.1 | 2.2 | 2.3 | 1.8 | 1.9 | 2.1 |
| Ascorbic acid | — | 0.061 | — | — | 0.061 | — |
| Color (#40 red) | — | 0.003 | — | — | 0.003 | — |
| Magnesium stearate | — | 0.75 | — | — | 0.75 | — |
| Talc | — | — | 0.5 | — | — | 0.5 |
| Cab-o-sil | 1.0 | — | — | 1.0 | — | — |
| Salt | — | 0.21 | — | — | 0.24 | — |

Gum pieces were thus from the various combination of the outer-shell formulations from Table I with the various center-fill formulations in Table II. Thus, for example, outer-shell formulation A and center-fills I–VI were used to form chewing gum pieces; formulation B was similarly combined to make chewing gum pieces using each of the center-fill formulations. The result was a total of thirty-six chewing gum pieces which either differences in chew, differences in shell flavor and center-fill flavor and differences in texture. The outer-shell formulations were specifically designed to have excellent film forming and bubble blowing capabilities and thus the gum pieces formed were found to have excellent bubble gum characteristics. The powdered center-fill of the bubble gum pieces was effectively delivered upon mastication and provided a unique mouthfeel and texture heretofore not known to the chewing gum industry.

The gum pieces prepared in the above example each had 17% powdered center-fill by weight of the total gum piece in the cavity of the outer-shell. As is apparent from the examples, a grape flavored outer-shell may be combined with a cherry flavored center-fill to provide a gum piece which is capable of delivering a mixture of flavors, while maintaining each in a separate portion of the gum piece. Upon mastication each individual flavor is readily recognizable and distinct.

The invention being thus described, it will be obvious that the same may be varied in many ways. Such variations are not to be regarded as a departure from the spirit and the scope of the invention and all such modifications are intended to be included within the scope of the claims.

We claim:

1. A center-filled chewing gum piece comprising an outer-shell and a cavity enclosed therein, said cavity containing a powdered center-fill comprising at least one sweetener and a lubricant selected from the group consisting of magnesium stearate, talc and colloidal silica in an amount from about 0.75% to about 1.0% by weight of the center-fill weight.

2. The gum piece of claim 1 wherein the powdered center-fill is present in the amount of about 10% to about 20% by weight of the gum piece.

3. The gum piece of claim 2 wherein the sweetener for the powdered center-fill is selected from the group consisting of water-soluble sweetening agents, water-soluble artifical sweetening agents, dipeptide-based sweeteners and mixtures thereof.

4. The gum piece of claim 3 wherein the sweetener for the powdered center-fill is sugar.

5. The gum piece of claim 3 wherein the sweetener for the powdered center-fill is a water-soluble sweetening agent selected from the group consisting of monosaccharides, disaccharides and polysaccharides and mixtures thereof.

6. The gum piece of claim 3 wherein the water-soluble sweetening agent is selected from the group consisting of polyhydric sugar alcohols.

7. The gum piece of claim 6 wherein the polyhydric sugar alcohols are selected from the group consisting of sorbitol, mannitol, xylitol, hydrogenated starch hydrolysate and mixtures thereof.

8. The gum piece of claim 3 wherein the dipeptide based sweetener is L-aspartyl-L-phenyl-alanine methyl ester.

9. The gum piece of claim 2 wherein the powdered center-fill additionally contains at least one flavoring agent and at least one coloring agent.

10. The gum piece of claim 1 wherein the powdered center-fill additionally contains at least one flavoring agent and at least one coloring agent.

11. The gum piece of claim 10 wherein the flavoring agent is a synthetic flavor oil, a natural flavor oil or essence or an artificial flavor.

12. The gum piece of claim 11 wherein the flavoring agent is selected from the group consisting of spearmint oil, cinnamon oil, oil of wintergreen (methylsalicylate), peppermint oils, lemon oil, orange oil, grape oil, lime oil, grapefruit oil, apple essence, strawberry essence, cherry essence, pineapple essence and mixtures thereof.

13. The gum piece of claim 12 wherein the flavoring agent is present in the powdered center-fill in the amounts of about 0.2% to about 1.5% by weight of the center-fill.

14. The gum piece of claim 10 wherein the coloring agent is FD&C Red #40.

15. The gum piece of claim 10 wherein the powdered center-fill further includes an acidulent in the amount of about 0.5% to about 3.0% by weight of the center-fill.

16. The gum piece of claim 1 wherein the outer-shell comprises a gum base, corn syrup, softeners, sugar, and optionally color and flavoring agents.

17. The gum piece of claim 16 wherein there is present malto dextrin, polydextrose and mixtures thereof.

18. A chewing gum piece comprising an outer-shell enclosing a cavity, said shell comprising about 10% to about 45% gum base, about 8% to about 25% corn syrup, softeners in the amount of about 0.2% to about 6% and sugar and a powdered center-fill contained within said cavity, in the amount of about 17% said center-fill, percents being based on the weight of the gum piece said center-fill comprising at least one sweetener and from about 0.75% to about 1.0% lubricant selected from the group consisting of magnesium stearate, talc and colloidal silica by weight of the center-fill weight.

19. The gum piece of claim 17 wherein the gum base comprises a natural or synthetic elastomer, a filler and an elastomer solvent.

* * * * *